United States Patent [19]

Burns et al.

[11] 4,313,458
[45] Feb. 2, 1982

[54] RESTRICTED MOVEMENT VALVE SEATS FOR AN EXPANDING GATE VALVE

[75] Inventors: Ivan A. Burns; William R. Hochmuth, both of Houston, Tex.

[73] Assignee: ACF Industries, Incorporated, New York, N.Y.

[21] Appl. No.: 209,180

[22] Filed: Nov. 21, 1980

Related U.S. Application Data

[62] Division of Ser. No. 95,911, Nov. 19, 1979, Pat. No. 4,246,928.

[51] Int. Cl.³ ............................................... F16K 43/00
[52] U.S. Cl. ................... 137/327; 251/167; 251/196; 251/360
[58] Field of Search ............... 137/315, 327; 251/167, 251/196, 328, 360

[56] References Cited

U.S. PATENT DOCUMENTS

| | | | |
|---|---|---|---|
| 3,110,470 | 11/1963 | Dumm | 251/167 X |
| 3,610,569 | 10/1971 | Reaves | 251/196 X |
| 3,746,305 | 7/1973 | Zakka | 251/360 |
| 4,116,419 | 9/1978 | Diehl | 251/196 |
| 4,124,194 | 11/1978 | Alvarez | 251/368 X |
| 4,240,460 | 12/1980 | Alaniz | 251/196 X |

*Primary Examiner*—Harold W. Weakley
*Attorney, Agent, or Firm*—Marvin J. Marnock; Eugene N. Riddle

[57] ABSTRACT

In an expanding gate valve, tangential pins (70) are received loosely in peripheral grooves (62) of floating valve seats (26) to prevent the seats from moving inwardly far enough to drag against a gate mechanism (32) which is collapsed for movement between open and closed positions of the valve. Alternative arrangements provide retainer rings (122, 130) which engage shoulders (128) of the seats to limit their inward floating movement.

2 Claims, 8 Drawing Figures

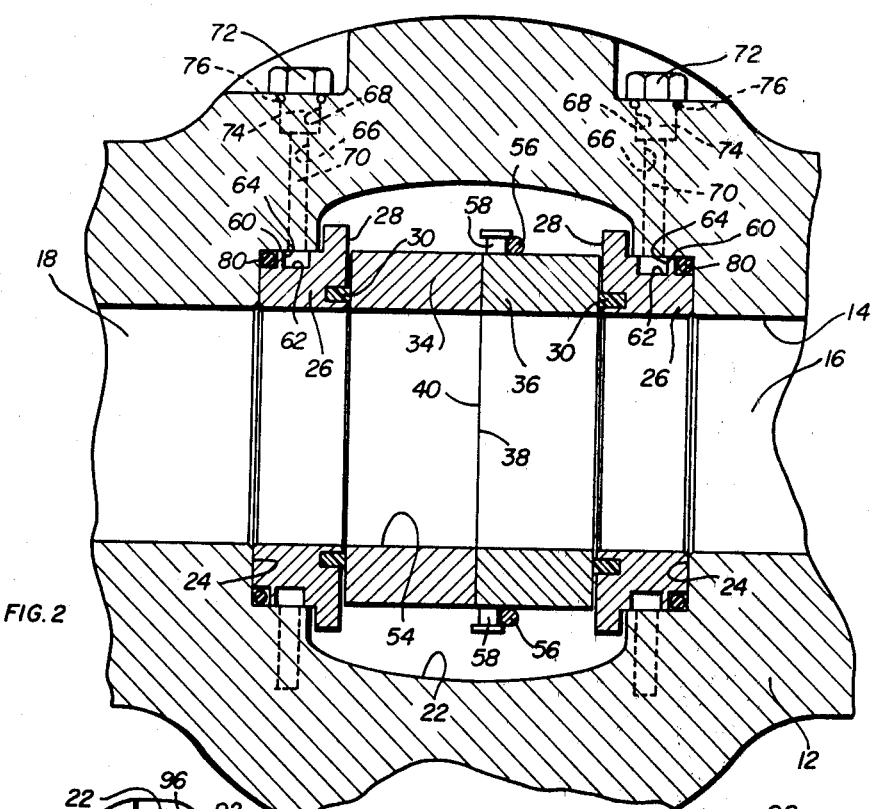
FIG. 2
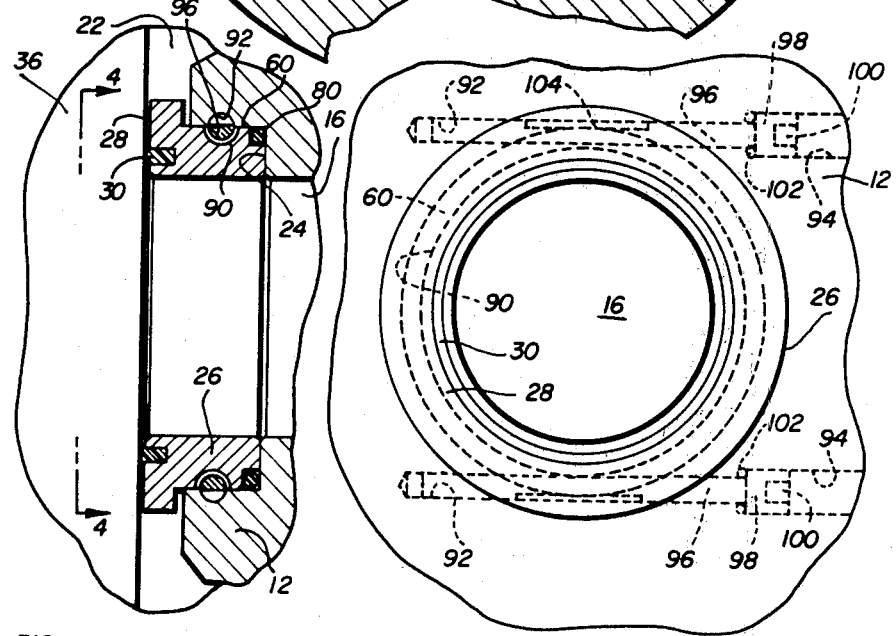
FIG. 3
FIG. 4

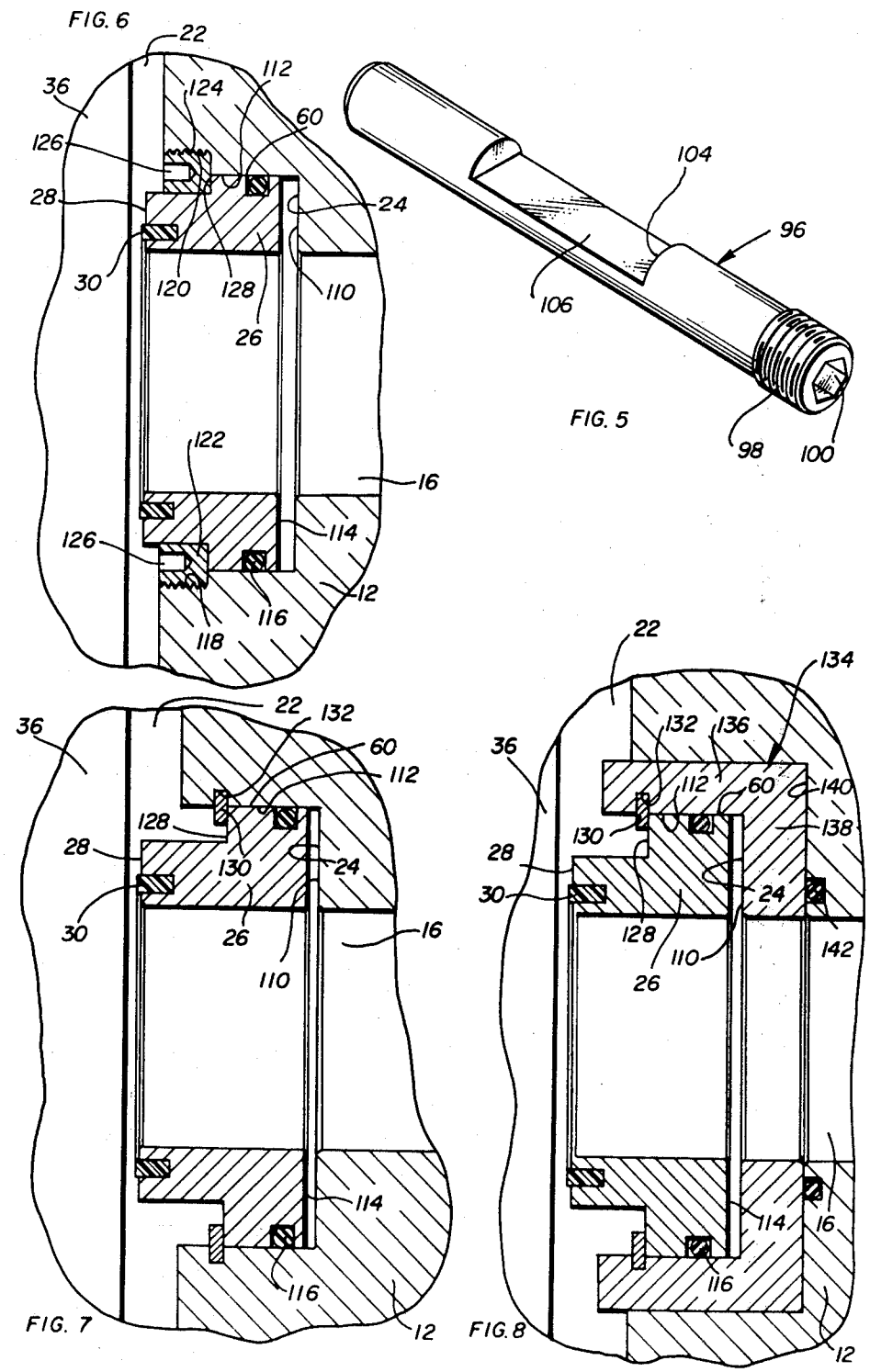

RESTRICTED MOVEMENT VALVE SEATS FOR AN EXPANDING GATE VALVE

This application is a division, of application Ser. No. 095,911, filed Nov. 19, 1979, U.S. Pat. No. 4,246,928.

BACKGROUND OF THE INVENTION

This invention relates generally to gate valves and deals more particularly with an expanding gate valve having floating valve seats which are restricted in their floating movement.

In a typical expanding gate valve, the gate assembly includes a cooperating gate and segment which are expanded by wedging action against the valve seats in both the open and closed positions of the valve. To prevent excessive dragging of the seats against the gate and segment, the gate assembly is collapsed or contracted inwardly of the seats during movement between the open and closed positions. It is usually preferred that the seats be mounted rather loosely in their seat pockets so that they have enough play to compensate for manufacturing tolerances and other irregularities and still seal effectively against the gate assembly. However, if the seats are able to float in an unrestricted manner in their pockets, they can move inwardly far enough to bind against the gate and segment when the gate mechanism is collapsed. This results in excessive operating torque of the valve and increased wear on the various components, particularly the sealing surfaces of the gate assembly and valve seats.

Various types of arrangements have been proposed to counteract this problem by limiting the extent to which the seat can move inwardly toward the gate assembly. For example, U.S. Pat. No. 3,823,911 to Natho et al provides seat spacers which maintain the seats far enough apart that they do not contact the collapsed gate assembly. U.S. Pat. No. 4,116,419 to Diehl et al utilizes seat retainers which serve as stops to maintain the valve seats outwardly of the collapsed gate assembly. Although these arrangements and others function in a satisfactory manner for the most part, they are not wholly without problems. If the means for controlling the floating movement of the seats is unduly complex, it adds significantly to the cost of the valve and the assembly difficulties. Increasing the size of the valve body is also undesirable in that the cost increases with increasing body size. In addition, removal of the seats must not be unduly difficult or time consuming since it is not uncommon for the seats to require repair or replacement.

SUMMARY OF THE INVENTION

The present invention is directed to an improved controlled float seat construction and has, as its primary object, the provision of a simple and effective arrangement for preventing the seats from binding against the collapsed gate assembly of an expanding gate valve. Another important object of the invention is to provide a controlled float seat construction wherein the seats may be quickly and easily removed from the valve body. A further object of the invention is to provide a controlled float seat construction of the character described which does not significantly increase the size of the valve body.

In accordance with a preferred embodiment of the invention, the valve seats of an expanding gate valve have peripheral grooves which receive tangential pins that are threaded into passages of the valve body. Each pin is smaller in diameter than the width dimension of the groove so that the seats can move back and forth in order to effectively seal against the gate mechanism when same is expanded in the open or closed position. However, when the seat mechanism is collapsed for movement between the open and closed positions, the pins engage the sides of the grooves to prevent the seats from floating inwardly far enough to drag against the gate mechanism. In a modified form of the invention, the pins have recesses which, upon the pins being turned to the appropriate rotative position, register with the grooves of the seats such that the seats are released and can be removed for inspection, repair or replacement. Additional modified forms of the invention provide retainer rings which are secured in various manners to the seat pockets at locations to limit inward floating movement of the valve seats.

BRIEF DESCRIPTION OF THE DRAWINGS

In the accompanying drawings which form a part of the specification and are to be read in conjunction therewith:

FIG. 2 is a fragmentary sectional view on an enlarged scale taken generally along line 2—2 of FIG. 1 in the direction of the arrows;

FIG. 3 is a fragmentary sectional view taken on a vertical plane and illustrating a valve seat constructed according to a second embodiment of the invention, with the gate mechanism expanded in the fully closed position of the valve;

FIG. 4 is a fragmentary view in elevation taken generally along line 4—4 of FIG. 3 in the direction of the arrows;

FIG. 5 is a perspective view of one of the pin members included in the embodiment shown in FIGS. 3 and 4;

FIG. 6 is a fragmentary sectional view taken on a vertical plane and illustrating a valve seat constructed according to a third embodiment of the invention, with the gate mechanism shown in its collapsed condition between the fully open and fully closed positions of the valve;

FIG. 7 is a fragmentary sectional view similar to FIG. 6 but illustrating a valve seat constructed according to a fourth embodiment of the invention, with the gate mechanism shown in its collapsed condition between the fully open and fully closed positions of the valve; and FIG. 8 is a fragmentary sectional view similar to FIGS. 6 and 7 but illustrating a valve seat constructed according to a fifth embodiment of the invention, with the gate mechanism shown in its collapsed condition between the fully open and fully closed positions of the valve.

DETAILED DESCRIPTION OF THE INVENTION

Figure 1:
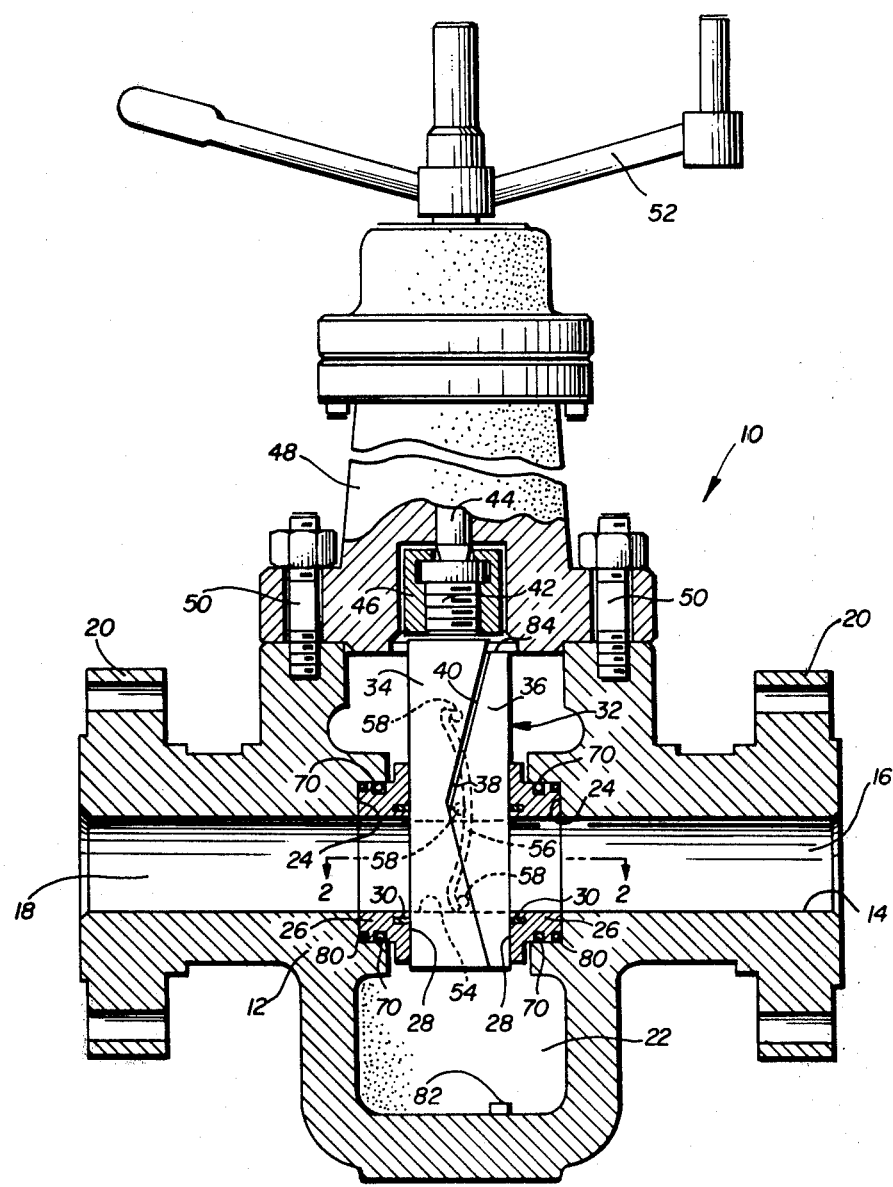
FIG. 1 is a sectional view of an expanding gate valve constructed according to a first embodiment of the present invention, with the gate mechanism expanded in the fully open position and the upper portion of the valve shown in elevation.

Referring now to the drawings in detail and initially to FIG. 1, numeral 10 generally designates an expanding gate valve constructed in accordance with the present invention. Valve 10 includes a valve body 12 having a flow passageway 14 formed by an inlet passage 16 and an aligned outlet passage 18. Flanges 20 are formed on opposite ends of body 12 to facilitate connection of the valve with a flowline. A body cavity or valve chamber 22 is formed in body 12 and intersects with flow passageway 14 between passages 16 and 18.

A pair of spaced apart seat pockets 24 are formed in valve body 12 around passages 16 and 18. Pockets 24 are annular and open into valve chamber 22 on opposite sides thereof. Mounted in each seat pocket 24 is an annular valve seat 26. Each seat 26 is mounted in its seat pocket in a manner permitting the seat to move inwardly and outwardly to a limited extent, as will be explained more fully. Seats 26 bottom out in their pockets 24 to limit their outward movement. Each seat 26 has a flat, annular inside sealing surface 28 which carries an annular face seal 30 formed of polytetrafluoroethylene or another suitable substance. Each valve seat 26 has a circular opening which is aligned with the flow passageway 14 of the valve.

Valve chamber 22 receives an expanding gate assembly generally designated by reference numeral 32. Gate assembly 32 includes a gate 34 and a segment 36 which have flat outside surfaces for sealing against surfaces 28 and face seals 30 in both the fully open and fully closed positions of the valve. The inside surface of gate 34 is a compound wedge surface which inclines in opposite directions above and below the center of the gate. A similarly inclined wedge surface 40 is formed on segment 36 to interact in wedging fashion with surface 38, as will be explained in more detail. Gate 34 has an upper threaded extension 42 which is slotted to receive the lower end of an operating stem 44. A nut 46 is threaded onto extension 42 and receives the lower end of stem 44. Stem 44 extends upwardly through a valve bonnet 48 which is secured by bolts 50 to the top of valve body 12. A handwheel 52 is mounted on top of bonnet 48 and is connected in threaded fashion with stem 44 in a well known manner such that turning of handwheel 52 effects axial reciprocation of stem 44 in order to move gate assembly 32 upwardly and downwardly between the open and closed positions of the valve.

In the open position of gate assembly 32 shown in FIG. 1, gate 34 and segment 36 cooperate to provide a flow port 54 which is aligned with flow passageway 14. In the closed position, gate assembly 32 is moved downwardly to move flow port 54 out of alignment with passageway 14, and gate 34 and segment 36 then block flow through the valve. A pair of curved springs 56 are mounted in a conventional manner to pins 58 which extend from the sides of gate 34 and segment 36. Springs 56 act to continuously urge gate assembly 32 toward a collapsed condition wherein wedge surfaces 38 and 40 are in flush contact with one another along the entire height of the gate assembly. Gate assembly 32 presents its minimum width when in the collapsed condition.

Referring now more particularly to FIG. 2, each valve seat 26 has a cylindrical peripheral surface 60 in which an annular groove 62 is formed in extension completely around the seat. Each groove 62 terminates at its outer side in a flat annular shoulder 64 which faces inwardly toward valve chamber 22. Formed in valve body 12 are a pair of passages 66 for each seat 26. The passages 66 in each pair are spaced one above the other in parallel relation, and each passage 66 intersects the corresponding groove 62 in tangent relationship to the bottom of the groove. The passages 66 in each pair intersect groove 62 at top and bottom portions thereof or at diametrically opposed locations on the groove.

Passages 66 extend into one side of valve body 12 and terminate at their inner ends within the valve body. Passages 66 are cylindrical and each has a diameter less than the width dimension of the associated groove 62 in the direction of the flow passageway. Each passage 66 has an internally threaded counterbore 68 adjacent the outside surface of valve body 12.

Each passage 66 receives an elongate cylindrical pin 70 which fits snugly in the passage. Pins 70 fit through grooves 62 in generally tangent relation thereto, with each pair of pins passing through the top and bottom portions of the groove. As will be explained in more detail, the diameter of each pin 70 is less than the width dimension of the corresponding groove 62 so that the pins serve to limit the inward floating movement of valve seats 26. Each pin 70 has a head 72 which is preferably hexagonal in order to conveniently receive a wrench. An enlarged threaded portion 74 of each pin 70 is formed adjacent head 72 and is threaded into counterbore 68 in order to secure the pins in passages 66. An O-ring 76 seals each pin 70 to valve body 12 at an outer portion of passage 66.

Each valve seat 26 is provided with an O-ring 80 located adjacent the outer surface 60 of the seat. O-rings 80 provide seals between the valve seats and pockets, and it is noted that the fluid pressure in passages 16 and 18 can enter between the bottom of the seat pocket and the adjacent base surface of the valve seat.

When the valve is in service, fluid is able to freely flow through body 12 if gate assembly 32 is in the fully open position shown in FIG. 1. To close gate assembly 32, handwheel 52 is turned in a direction to move valve stem 44 and the attached gate mechanism downwardly. Initial downward movement of gate 34 relieves the wedging force between the lower portions of wedge surfaces 38 and 40 as the upper portion of surface 38 moves toward the upper portion of surface 40. Springs 56 then act to urge gate 34 and segment 36 together to the collapsed condition of the gate assembly wherein surfaces 38 and 40 are in flush contact along the entire height of the gate assembly. In the collapsed condition, gate 34 and segment 36 are located inwardly of sealing surfaces 28 of the valve seats in order to facilitate movement of the gate assembly between the open and closed positions. When the gate assembly is collapsed, seats 26 are able to float inwardly toward one another to a limited extent. The limiting position of each seat is reached when shoulder 64 of groove 62 is engaged by the upper and lower pins 70. The dimensions of the components are chosen such that when gate assembly 32 is in the fully collapsed condition and shoulders 64 are engaged against pins 70, there is a small gap between gate assembly 32 and each of the sealing surfaces 28. Consequently, gate assembly 32 is not contacted by either of the valve seats and can be easily moved between the open and closed positions without dragging against the seats. The operating torque of the valve is thus reduced, as is the wear on the sealing faces of the gate assembly and valve seats.

When the fully closed position of gate assembly 32 is reached, the lower end of segment 36 contacts a stop 82 (FIG. 1) formed on valve body 12 at the bottom of valve chamber 22. Continued downward movement of gate 34 causes the upper portions of wedge surfaces 38 and 40 to wedge against one another so as to expand gate 34 and segment 36 laterally against valve seats 26. In the fully closed position of the valve, gate assembly 32 is fully expanded into sealing contact with sealing surfaces 28 and face seals 30 to prevent fluid leakage.

Opening of the valve is effected by turning handwheel 52 to move stem 44 upwardly. Initial upward movement of gate 34 relieves the wedging force between the upper portions of surfaces 38 and 40, and springs 56 then act to collapse the gate assembly. The gate assembly is thereafter maintained in the collapsed condition as it moves upwardly toward the open position of the valve. Again, engagement of pins 70 against shoulders 64 prevents valve seats 26 from floating inwardly against the collapsed gate mechanism. As gate assembly 32 approaches the fully open position, the top end of segment 36 engages a stop 84 formed on bonnet 48. Continued upward movement of gate 34 causes wedging interaction between the lower portions of surfaces 38 and 40 to expand gate 34 and segment 36 against sealing surfaces 28 and face seals 30. In the fully open position of the valve shown in FIG. 1, the gate and segment are fully expanded against the valve seats to provide a uniform flow passage through the valve.

Referring now to FIGS. 3-5, a modified form of the invention includes for the most part the same components shown in FIGS. 1 and 2. The same reference numerals are employed in FIGS. 3-5 to indicate components which are similar to those described in connection with the first embodiment of the invention. The second embodiment of the invention differs from the first embodiment only in the configuration of the pins and their interaction with the grooves of the valve seats.

As shown in FIGS. 3 and 4, each valve seat 26 has an annular groove 90 in its peripheral surface 60. Groove 90 is semi-circular in section. A pair of passages 92 are formed in valve body 12 for each seat 26, with the passages in each pair being spaced one above the other in parallel relation. Passages 92 intersect grooves 90 in tangent relaton to the groove bottoms and at diametrically opposed locations at upper and lower portions of the grooves. Each passage 92 intersects with pocket 24 in a manner such that approximately half of each passage 92 does not coincide with groove 90 at its intersection therewith. Each passage 92 has an internally threaded counterbore 94. Each groove 90 is somewhat larger in diameter than passages 92.

Each passage 92 is cylindrical and closely receives an elongate cylindrical pin 96 having an externally threaded head 98 which is threaded into counterbore 94. Each head 98 has a tool receiving recess 100. An O-ring 102 provides a seal between each pin 96 and the corresponding passage 92. Pins 96 have smaller diameters than grooves 90 so that the pins fit loosely in the grooves. As best shown in FIG. 5, each pin 96 has a semicylindrical notch or recess 104 formed centrally along its length. A flat surface 106 defining the inner boundary of recess 104 is located on a diameter of pin 96.

In use, the arrangement shown in FIGS. 3-5 functions in essentially the same manner as the first embodiment of the invention. Pins 96 are installed in passages 92 with flat surfaces 106 facing outwardly such that the pins extend tangentially through the groove 90 of each valve seat 26. The dimensions are chosen so that when gate assembly 32 is in its collapsed condition, the outside portion of each groove 90 contacts the corresponding pin 96 before seat 26 can float inwardly far enough to contact the collapsed gate mechanism. Consequently, the gate mechanism can move in its collapsed condition between the open and closed positions without dragging against the valve seats. In order to remove seats 26 from their pockets 24, pins 96 are rotated 180° until flat surfaces 106 face inwardly. In this position, recesses 104 register with grooves 90 to remove all portions of the pins from the grooves, and seats 26 are thus released from pins 96. The seats can then simply be pulled inwardly into valve chamber 22 and removed from the valve for inspection, repair or replacement. New or reconditioned seats can be installed in pockets 24, and pins 96 can subsequently be turned 180° to retain valve seats 26 in their pockets while permitting them to float inwardly and outwardly to a limited extent.

FIG. 6 illustrates another modified arrangement wherein the same reference numerals are used to identify components which are similar to those described previously in connection with FIGS. 1-5. Each seat pocket 24 has a flat annular bottom surface 110 and a cylindrical outer surface 112 which contacts the peripheral surface 60 of valve seat 26. Each seat 26 has an annular base surface 114 which is adapted to flatly contact bottom surface 110 of the seat pocket to limit outward movement of the seat. An O-ring 116 is carried in an annular groove formed in surface 60 to provide a seal between surfaces 60 and 112. The outer surface 112 of each seat pocket 24 has an annular recess 118 formed therein at a location adjacent valve chamber 22. Recess 118 has an outer cylindrical surface 120 which is internally threaded.

A seat retainer ring 122 is mounted in recess 118. Ring 122 has a threaded outer surface 124 which is threaded to surface 120 in order to mount the retainer ring in recess 118. Ring 122 has a plurality of tool receiving openings 126 for receiving a spanner tool (not shown). Ring 122 projects inwardly beyond surface 112 into seat pocket 24 and confronts on annular shoulder 128 formed on valve seat 26 adjacent the outer peripheral surface 60. Shoulder 128 faces inwardly toward the gate mechanism and is located approximately midway between base surface 114 and sealing surface 28. The distance between base surface 114 and shoulder 128 is less than the distance between seat pocket bottom surface 110 and the retainer ring 122.

The arrangement of FIG. 6 limits the inward floating movement of valve seats 26 in much the same manner as described previously. The dimensions of the components are chosen such that with gate mechanism 32 in the collapsed condition shown in FIG. 6, retainer ring 122 contacts shoulder 128 before seat 26 can move inwardly far enough to contact the gate assembly. Accordingly, the gate assembly can be moved in its collapsed condition between the open and closed positions without dragging against valve seats 26. When the gate assembly is expanded, it seals against surface 28 and face seal 30 with base surface 114 of the seat bottomed against the bottom surface 110 of seat pocket 24.

FIG. 7 shows still another embodiment which differs from the FIG. 6 embodiment in that the threaded retainer ring 122 is replaced by a snap ring 130 and an annular groove 132 is formed in surface 122 to provide a recess therein for receiving snap ring 130. Snap ring 130 is mounted closely in groove 132 in a snap fit therein. Ring 130 projects inwardly of surface 112 into pocket 24. Again, the dimensions are chosen such that when gate assembly 32 is in the collapsed condition shown in FIG. 7, shoulder 128 contacts snap ring 130 before valve seat 26 can move inwardly far enough to contact the gate assembly. The gate assembly is thus able to be moved in its collapsed condition between the open and closed positions without binding against the valve seats.

FIG. 8 illustrates yet another embodiment of the invention which differs from the FIG. 7 arrangement only in that each seat pocket 24 is formed within an annular member 134 having a cylindrical sleeve portion 136 and an integral base portion 138 projecting inwardly from the outer end of portion 136. Member 134 is L-shaped in section and is mounted in valve body 12 in an annular recess 140 formed about each flow passage 16 and 18 adjacent valve chamber 22. An O-ring 142 provides a seal between base portion 138 and valve body 12. The outer cylindrical surface 112 of seat pocket 24 is formed on the inner surface of sleeve portion 136, and bottom surface 110 is formed on the inside surface of portion 138. Snap ring 130 is mounted in a snap fit in the annular groove 132 which is formed in surface 112 to provide a recess therein.

The embodiment shown in FIG. 8 functions in essentially the same manner as the FIG. 7 embodiment. Snap ring 130 engages shoulder 128 before valve seat 26 can move inwardly far enough to contact gate assembly 32 when same is in the collapsed position. Again, this permits movement of the collapsed gate assembly between the open and closed positions without the valve seats dragging against it.

In each embodiment of the invention, the valve seats 26 are mounted in their seat pockets 24 for limited floating movement which provides them with enough play to compensate for lack of parallemism in the sealing surfaces of the seats and gate and for other irregularities or imperfections. At the same time, the various arrangements for controlling the floating movement of the seats prevent the seats from dragging against the gate mechanism when it is collapsed for movement between the open and closed positions. Valve seats 26 may be quickly and easily removed for repair or replacement, and new or reconditioned seats can be conveniently installed in the valve body.

The extent to which each valve seat can float can be made adjustable. For example, the portion of each pin 70 located in groove 62 can be formed as a cam surface so that the rotative position of the pin determines the distance each valve seat is allowed to float before shoulder 64 contacts the cam surface.

Also, while the embodiment of FIGS. 1 and 2 and the embodiment of FIGS. 3 and 4 show respective pins 70 and 96 as being positioned within openings that are accessible from a location outside the valve body, it is understood that such pins may be positioned within openings that are accessible only from within the valve chamber. This would eliminate the necessity for seals about the pins and limit easy accessiblity to the pins.

What is claimed is:

1. In an expanding valve structure having a valve body presenting a valve chamber and a fluid flow passageway, an expandable valve member mounted in the valve chamber for movement in a collapsed condition between open and closed positions, and means for expanding the valve member to an expanded condition in both the open and closed positions, the improvement comprising:

a pair of spaced apart seat pockets formed about the flow passageway adjacent the valve chamber and on opposite sides thereof, each said seat pocket opening to the valve chamber and having a bottom surface disposed generally transverse to the passageway and extending substantially radially therefrom and a cylindrical outer surface substantially coaxial with said passageway, said cylindrical outer surface presenting an annular recess therein at a location spaced from said bottom surface and encompassing the flow passage, said annular recess opening to the valve chamber and having a bottom wall residing in a plane substantially radial to the flow passageway and a threaded circumferential surface which is coaxial with said passageway extending from said bottom wall to the valve chamber;

a pair of annular valve seats mounted in said seat pockets in a manner permitting limited inward and outward movement of said seats toward and away from one another, each seat having a base surface adjacent the bottom surface of the pocket and an inner sealing surface for sealing against the valve member in the open and closed positions thereof, each seat also having a cylindrical outer surface adjacent said outer surface of the corresponding seat pocket and a shoulder between said base and sealing surfaces facing toward said valve member, said shoulder being provided by a reduced external diameter portion of said valve seat;

a seat retaining ring mounted in each said recess, each said seat retaining ring having an external diameter corresponding to the diameter of the circumferential surface of each said recess and being externally threaded for cooperative threaded engagement with the threaded surface of the recess, said seat retaining ring having an internal diameter which is less than that of the unrecessed portion of the cylindrical outer surface of its associated seat pocket whereby said seat retaining ring projects out of the recess into the seat pocket inwardly of said cylindrical outer surface, said shoulders of the seats being adapted to engage the retaining rings to limit movement of the seats in the direction towards the valve member to positions wherein said sealing surfaces of the seats are spaced outwardly of the valve member in the collapsed condition thereof.

2. A valve structure as recited in claim 1 wherein the surface of the retaining ring facing in the direction of the valve member is provided with a plurality of cavities therein for receiving a spanner tool whereby the retaining ring may be easily installed or removed.

* * * * *